US012709941B2

(12) United States Patent
Stoddard

(10) Patent No.: US 12,709,941 B2
(45) Date of Patent: Aug. 18, 2026

(54) FINGER GUARD FOR A ROLLER AND A SYSTEM INCORPORATING THE SAME

(71) Applicant: Southworth International Group, Inc., Falmouth, ME (US)

(72) Inventor: Scott Stoddard, Gorham, ME (US)

(73) Assignee: Southworth International Group, Inc., Falmouth, ME (US)

( * ) Notice: Subject to any disclaimer, the term of this patent is extended or adjusted under 35 U.S.C. 154(b) by 200 days.

(21) Appl. No.: 18/590,443

(22) Filed: Feb. 28, 2024

(65) Prior Publication Data

US 2025/0270877 A1 Aug. 28, 2025

(51) Int. Cl.
*E06B 7/36* (2006.01)

(52) U.S. Cl.
CPC .................................... *E06B 7/367* (2013.01)

(58) Field of Classification Search
CPC .................................. E06B 7/36; E06B 7/367
See application file for complete search history.

(56) References Cited

U.S. PATENT DOCUMENTS

| | | | |
|---|---|---|---|
| 5,022,185 A | 6/1991 | Oatman | |
| 5,528,862 A | 6/1996 | Streeter | |
| 6,751,907 B1 | 6/2004 | De Gasperis | |
| 7,549,456 B2 * | 6/2009 | Preising, Jr. | E05D 15/165 16/91 |
| 7,882,944 B1 | 2/2011 | Eubanks et al. | |
| 9,364,121 B2 | 6/2016 | Sprague | |
| 10,926,955 B1 | 2/2021 | Malina et al. | |
| 2005/0115021 A1 | 6/2005 | Tsai | |
| 2015/0164284 A1 | 6/2015 | Sprague | |
| 2019/0277084 A1 | 9/2019 | Dintheer et al. | |
| 2021/0053761 A1 | 2/2021 | Malina et al. | |
| 2021/0123299 A1 | 4/2021 | Dintheer et al. | |

FOREIGN PATENT DOCUMENTS

| | | | |
|---|---|---|---|
| CN | 106150249 A | 11/2016 | |
| DE | 2101406 | 7/1971 | |
| DE | 4308413 A1 * | 9/1994 | A47K 3/34 |
| GB | 2564461 | 1/2019 | |

OTHER PUBLICATIONS

English Machine Translation of DE-4308413-A1 (Year: 1994).*
PCT Search Report and Written Opinion mailed Apr. 17, 2025, received in corresponding PCT Application No. PCT/ US25/17805, 10 pages.

* cited by examiner

*Primary Examiner* — Sarang Afzali
(74) *Attorney, Agent, or Firm* — Secant IP, PLLC

(57) ABSTRACT

A finger guard for blocking a pinch point in a system including a base, at least one roller pin coupled to the base, a roller rotatably supported on the at least one roller pin, and a movable structure supported on the roller and movable over the roller relative to the base. The finger guard includes a side wall extending from a front wall, whereby the side wall and the front wall at least partially define a cavity for receiving the roller. The finger guard further includes a roller pin opening extending through the front wall for receiving the roller pin. A fastener may be coupled to the roller pin to couple the finger guard to the base.

12 Claims, 4 Drawing Sheets

FINGER GUARD FOR A ROLLER AND A SYSTEM INCORPORATING THE SAME

TECHNICAL FIELD

The technical field relates to finger guards, and, in particular, to a finger guard for a roller and a system incorporating the same.

BACKGROUND INFORMATION

A variety of systems incorporating one or more rollers are known. In general, these systems may include base, one or more rollers fixed to the base, and a movable structure disposed on the rollers for movement relative to the base. A user may move the movable structure relative to the base by imparting a force to the movable structure to move the movable structure over the rollers. This allows the user to place the movable structure in a desired position relative to the base.

In some embodiments, for example, the movable structure may be a door and the base may be a door frame. The door may be moved to an open position by moving the door over the rollers relative to the door frame. In other embodiments, the movable structure may be a platform for supporting an object, such as a container. The platform may be moved, e.g. linearly and/or rotationally, over the rollers and relative to the base to place the object in a desired position for loading or unloading or performing work on the object.

One example of a system incorporating rollers is illustrated in FIG. 1. The illustrated example system 100 includes a base 102 and a movable structure configured as a platform 104. As shown in FIG. 2, the base 102 may include one or more roller(s) 106 rotationally supported by a roller pin 108 extending outwardly from a perimeter rim 110 of the base 102. The platform 104 is supported on the base 102 by the roller(s) 106. The platform 104 may be rotated relative to the base 102 by imparting a force to move the platform 104 over the roller(s). This allows an object (not shown), e.g. a container, placed on the platform 104 to be placed in a desired rotational position relative to the base 102. On example of a system as shown in FIGS. 1 and 2 is known as the PalletPal® pallet positioner, which is commercially available from the Southworth International Group, Inc. of Southworth, Maine, USA.

One challenge associated with some systems including roller(s) and movable structures supported by the roller(s) is that the roller(s) can provide a pinch point, e.g., if the movable structure is moved improperly. For example, in some instances a user may grasp a platform 104 to move the platform 104 over the roller(s) 106 relative to the base 102, but the user's fingers may be positioned between the platform 104 and a roller 106. During the movement, the user's fingers may be pinched between a roller 106 or the base and the moving platform 104.

BRIEF DESCRIPTION OF THE DRAWINGS

Objects, features, and advantages disclosed herein will be apparent from the following description of particular embodiments, as illustrated in the accompanying drawings in which like reference characters/descriptions refer to the same parts throughout the different views. The drawings are not necessarily to scale, emphasis instead being placed upon illustrating the principles disclosed herein. For purposes of clarity, not every component may be labeled in every drawing.

DETAILED DESCRIPTION

Figure 1:
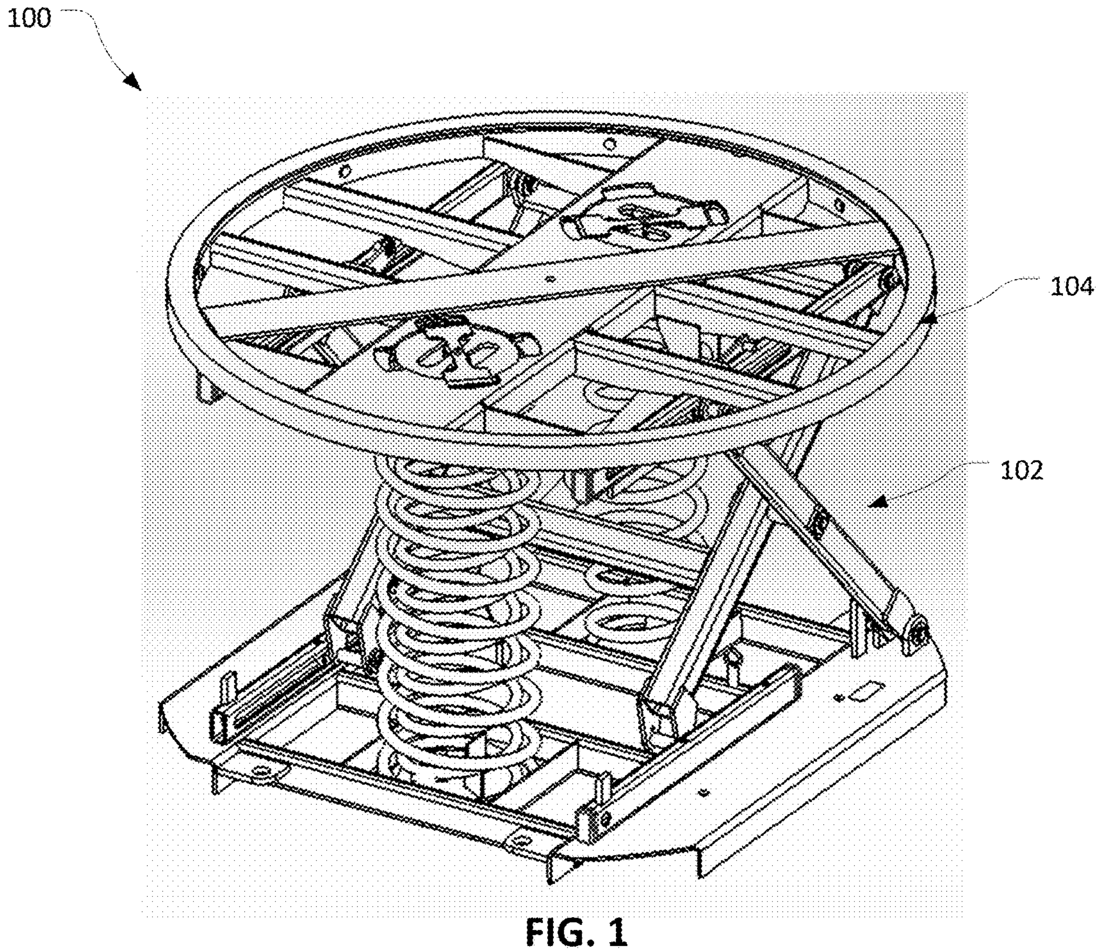
FIG. 1 Prior Art
FIG. 1 is a top isometric view of one example of a prior art system including a base, a movable structure in the form of a platform, and rollers for supporting the platform on the base.

The present disclosure is not limited in its application to the details of construction and the arrangement of components set forth in the following description or illustrated in the drawings. The examples described herein may be capable of other embodiments and of being practiced or being carried out in various ways. Also, the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

In general, a system consistent with the present disclosure may include a base, at least one roller pin coupled to the base; a roller rotatably supported on the at least one roller pin; a movable structure, e.g. platform, supported on the roller and movable over the roller relative to the base; and a finger guard consistent with the present disclosure for blocking pinch point between the movable structure and the base and/or roller. The finger guard may include a front wall; a side wall extending from the front wall, whereby the side wall, the front wall and the base at least partially define a cavity; and a roller pin opening extending through the front wall. The roller may be at least partially disposed in the cavity with the roller pin extending through the roller pin opening. A fastener may be coupled to the roller pin to couple the finger guard to the base. Advantageously, as the movable structure is moved over the roller, a user's fingers would contact the sidewall of the finger guard to protect the user's fingers from being pinched between the movable structure and the roller and/or the base.

Figure 2:
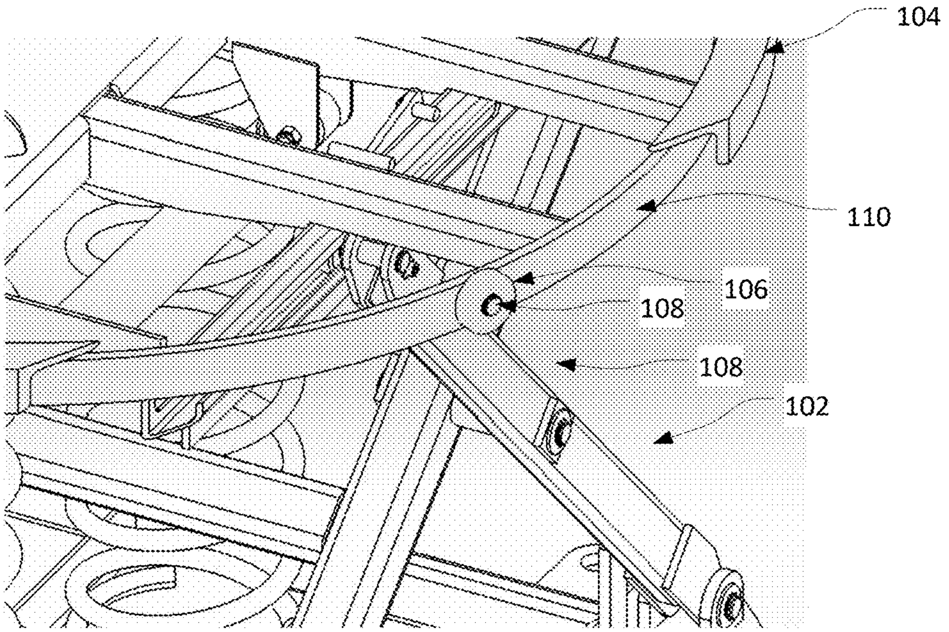
FIG. 2 Prior Art
FIG. 2 is top isometric view of the prior art system shown in FIG. 1 with a portion of the platform removed to show a roller.
Figure 3:
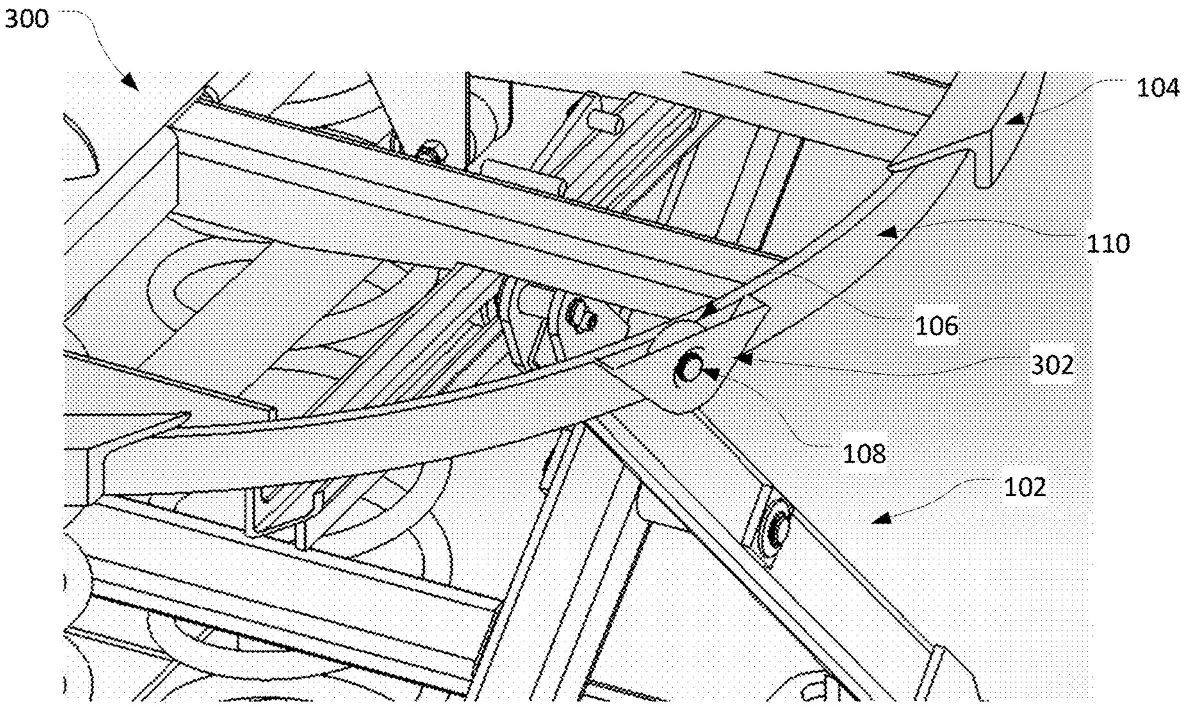
FIG. 3 is an isometric view of a portion of system consistent with the present disclosure showing a portion of the system of FIG. 1 with a portion of the platform removed to show a finger guard consistent with the present disclosure.

FIG. 3 illustrates one example system 300 consistent with the present disclosure showing a portion of the system of FIG. 1 with a portion of the platform 104 removed to show a finger guard 302 consistent with the present disclosure disposed over the roller 108. The system 300 includes the base 102, the platform 104, the roller 106, and the roller pin 108, as shown in FIGS. 1 and 2, along with the finger guard 302. Advantageously, the finger guard 302 acts to eliminate a pinch point between the platform 104 and the base 102 and/or roller 106 when the platform 104 is rolled over the rollers to rotate the platform 104 relative to the base 102. It is to be understood that although the illustrated example embodiment includes a finger guard 302 applied to the pallet positioner shown in FIG. 1, this embodiment is shown only by way of example and not of limitation. A finger guard 302 consistent with the present disclosure may be provided in a wide variety of systems including rollers to prevent a pinch point between components of the system.

Figure 4:
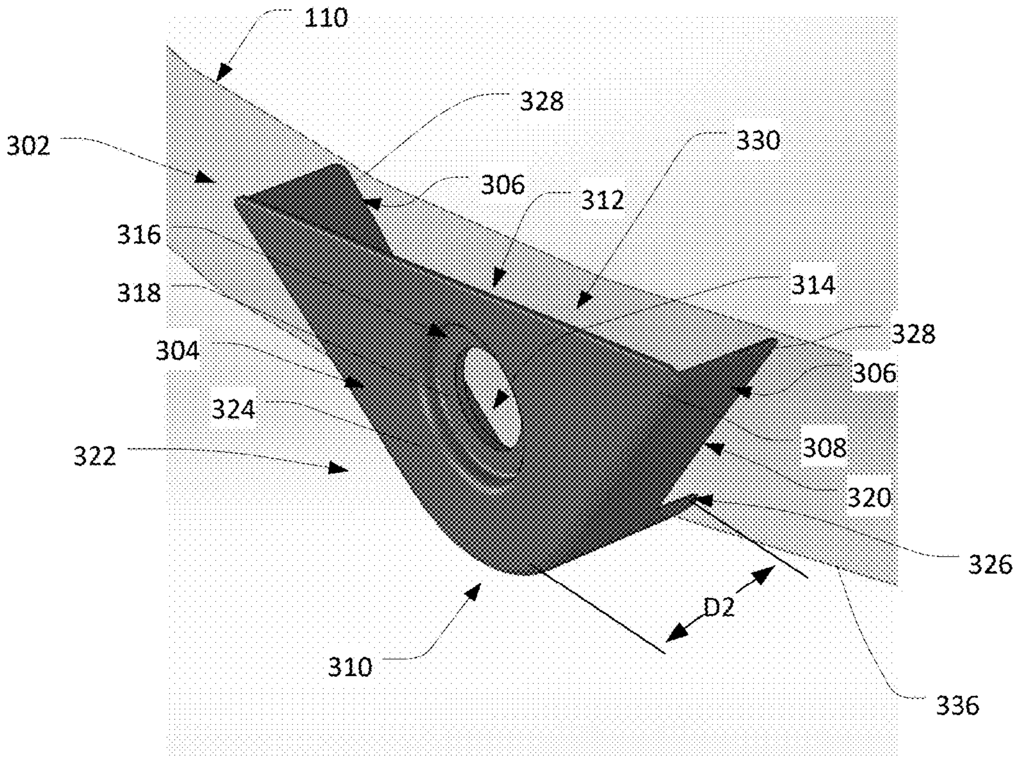
FIG. 4 is a top isometric view of the finger guard shown in FIG. 3 showing a perimeter rim of the base in phantom view.
Figure 5:
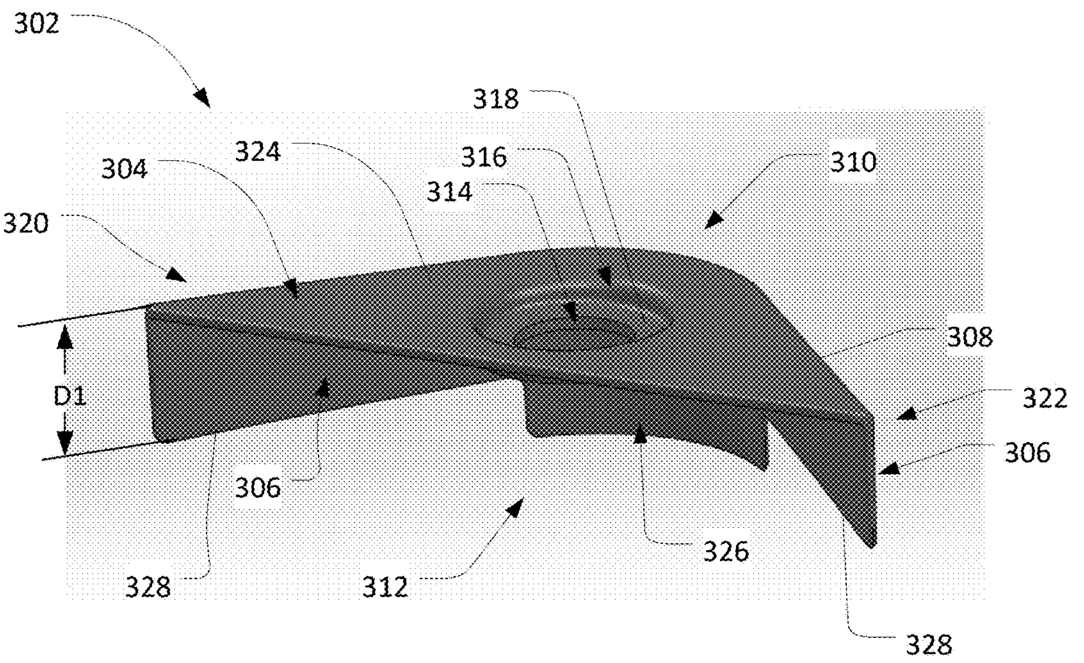
FIG. 5 is a top isometric view of the finger guard shown in FIG. 3.

The example finger guard 302 is illustrated in FIGS. 4 and 5. The finger guard 302 may be machined or molded as single unitary component. In the illustrated example embodiment, the finger guard 302 includes a front wall 304 and a side wall 306 extending around a portion of the perimeter 308 of the front wall 304. The front wall 304 is generally triangular in shape having an apex at a bottom 310 of the finger guard 302 and a base 102 at a top 312 of the finger guard 302. The front wall 304 includes a roller pin opening 314 extending therethrough and a circular depression 316 coaxial with the roller pin opening 314 and defining a shelf 318 extending circumferentially around the roller pin opening 314.

The side wall 306 extends substantially perpendicularly from the perimeter 308 of the front wall 304 and continuously around a first side 320 of the finger guard 302, the bottom 310 of the finger guard 302, and a second side 322 of the finger guard 302. At the first side 320 of the finger guard 302 and the second side 322 of the finger guard 302, the side wall 306 extends to a distance D1 (FIG. 5) from the front surface 324 of the front wall 304. At the bottom 310 of the finger guard 302 the side wall 306 extends to a distance D2 (FIG. 4) from the front surface 324. The distance D2 is greater than the distance D1 to define a side wall extension 326. The side wall 306 does not extend from the perimeter 308 of the front wall 304 at the top 312 of the finger guard 302.

As shown for example in FIG. 4, a distal end surface 328 of the side wall 306 at the first side 320 of the finger guard 302 and the second side 322 of the finger guard 302 may contact the perimeter rim 110 of the base 102. When the finger guard 302 is positioned on the perimeter rim 110, a cavity 330 is thus defined between the perimeter rim 110 of the base 102, the side wall 306, and the interior surface 332 of the front wall 304. The cavity 330 has an open top since the side wall 306 does not extend from the perimeter 308 of the front wall 304 at the top 312 of the finger guard 302. The width of the cavity 330 is defined by the distance D1, which is selected so that a portion of the roller 106 may be disposed within the cavity 330 with a top 334 of the roller 106 extending above the open top of the cavity 330 to engage the platform 104, as shown for example in FIG. 6. The side wall extension 326 is configured to extend under the perimeter rim 110 of the base 102 and contact a bottom surface 336 of the perimeter rim 110 to prevent access to the cavity 330 from the bottom 310 of the finger guard 302, which may extend below the bottom surface 336 of the perimeter rim 110.

A finger guard 302 consistent with the present disclosure may thus be provided in a variety of configurations. For example, although the illustrated example finger guard 302 has a specific geometric shape, i.e. triangular, it is to be understood that a finger guard 302 consistent with the present disclosure may be provided in a variety of shapes. Also, the side wall 306 extends substantially perpendicularly from the perimeter 308 of the front wall 304 but may extend perpendicularly or at any other non-zero angle from the perimeter 308 of the front wall 304 or from any other point on the interior surface 332 of the front wall 304. The side wall 306 may also extend only partly around the first side 320, the second side 322, and/or the bottom 310 of the finger guard 302. Also, the front surface 324 of the front wall 304 in the illustrated example embodiment is generally planar with the depression 316 positioned concentrically and circumferentially around the roller pin opening 314. The front surface 324 of the front wall 304 may be non-planar and/or may or may not include a depression 316.

Figure 6:
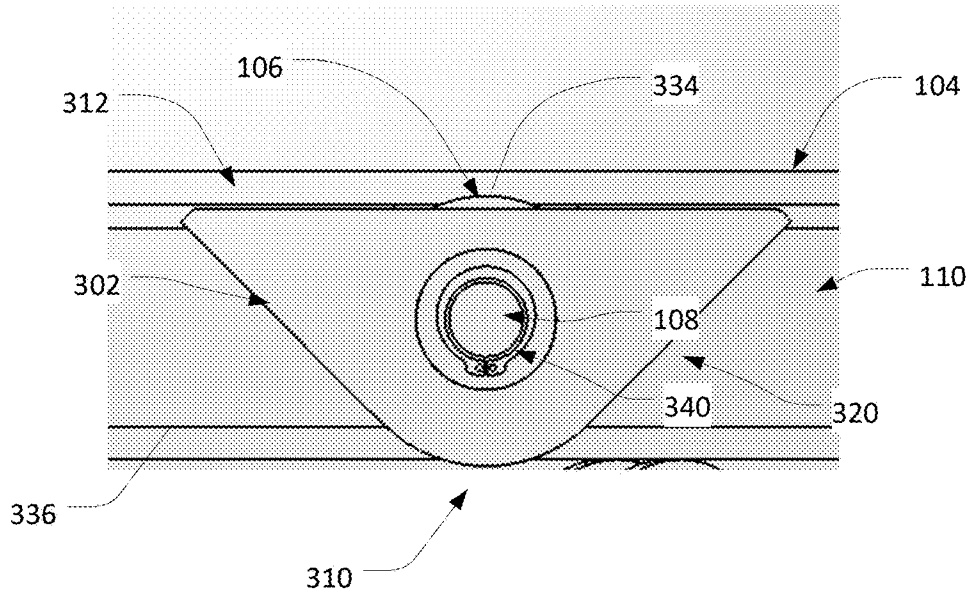
FIG. 6 is a side view of a portion of the system shown in FIG. 3.
Figure 7:
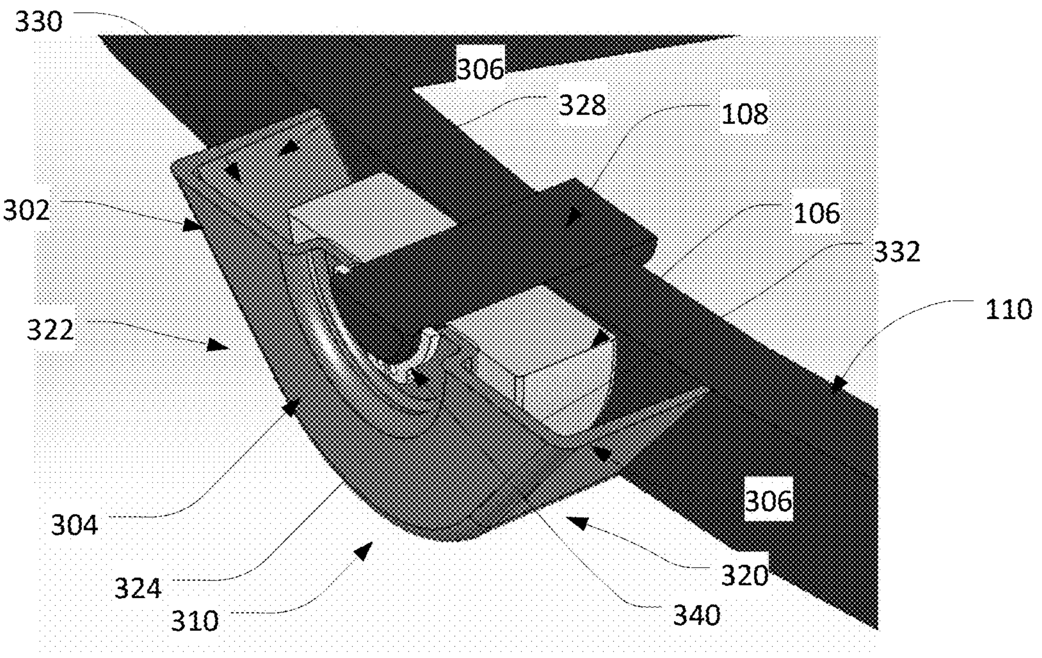
FIG. 7 a top isometric sectional view of a portion of the system shown in FIG. 3.

As shown in FIGS. 6 and 7, the finger guard 302 may be installed over the roller 106 with the roller pin 108 extending through the roller pin opening 314. A fastener 340 may be positioned on the end of the roller pin 108 and against the shelf 318 defined by the depression 316 in the front surface 324 of the front wall 304. The fastener 340 may thus be coupled to the roller pin 108 and against the front surface 324 of the front wall 304 to couple the finger guard 302 to the base 102. In the illustrated example embodiment, the fastener 340 is a known retaining ring, which allows for removable coupling of the finger guard 302 to the roller pin 108. It is to be understood, however, that the fastener 340 may be any fastener configured for permanently or removably coupling the finger guard 302 to the roller pin 108.

Figure 8:
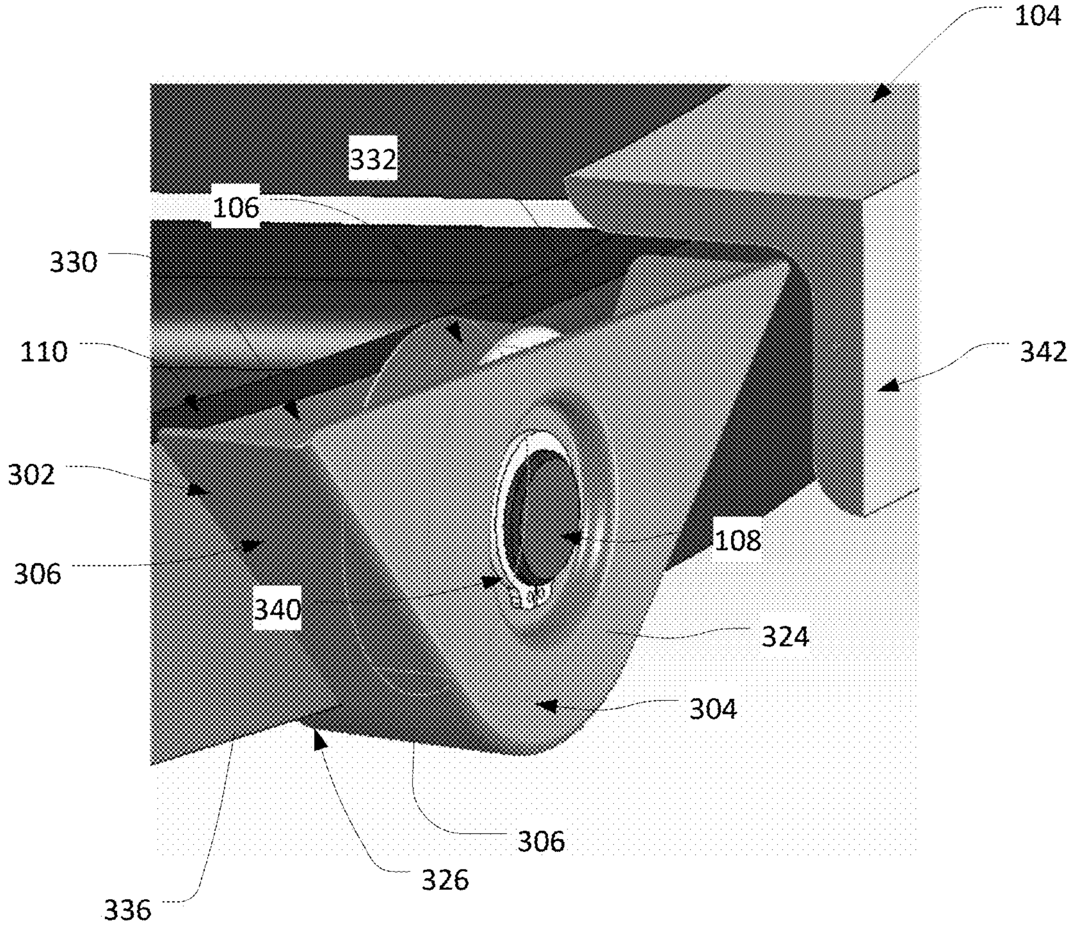
FIG. 8 a top isometric view of a portion of the system shown in FIG. 3.

When the finger guard 302 is coupled to the roller pin 108, the roller 106 is disposed in the cavity 330 and the top 334 of the roller 106 extends upwardly from the cavity 330 beyond the top 312 of the finger guard 302 to contact the platform 104, as shown in FIG. 6. As shown in FIG. 8, the side wall extension 326 at the bottom 310 of the finger guard 302 extends beneath the perimeter rim 110 of the base 102 to close access to the cavity 330 from the bottom of the finger guard 302 and to assist in aligning the roller pin opening 314 with the roller pin 108. The platform 104 may roll along the roller 106 with a front wall 342 of the platform 104 passing in front of the front surface 324 of the front wall 304. If a user places a finger behind the front wall 342 of the platform 104 while moving the platform 104 over the roller 106, the finger would contact the side wall 306 of the finger guard 302 to prevent pinching of the finger between the front wall 342 of the platform 104 and the roller 106 and/or rim 110 of the base 102.

Consistent with one aspect of the present disclosure there is provided an apparatus including: a base; at least one roller pin coupled to the base; a roller rotatably supported on the at least one roller pin; a movable structure supported on the roller and movable over the roller relative to the base; a finger guard including; a front wall, a side wall extending from the front wall, whereby the side wall, the front wall and the base at least partially define a cavity, and a roller pin opening extending through the front wall, the roller being at least partially disposed in the cavity with the roller pin extending through the roller pin opening; and a fastener coupled to the roller pin to couple the finger guard to the base.

Consistent with another aspect of the disclosure there is provided an apparatus including: a base; at least one roller pin coupled to the base; a roller rotatably supported on the at least one roller pin; a movable structure supported on the roller and movable over the roller relative to the base; a finger guard including; a front wall, a side wall extending substantially perpendicularly from the perimeter of the front wall and toward the base, the sidewall extending around a first side, a bottom, and a second side of the finger guard, whereby the side wall, the front wall and the base at least partially define a cavity, and a roller pin opening extending through the front wall, the roller being at least partially disposed in the cavity with a top of the roller extending above a top the finger guard for contacting the movable structure and with the roller pin extending through the roller pin opening; and a fastener coupled to the roller pin to couple the finger guard to the base, whereby the front wall of the movable structure is positioned to pass in front of the front wall of the finger guard as the movable structure is moved over the roller relative to the base.

Consistent with another aspect of the disclosure there is provided a finger guard including: a front wall; a side wall extending from the front wall, whereby the side wall and the front wall at least partially define a cavity for receiving a roller rotatably mounted on a roller pin; a roller pin opening extending through the front wall for receiving the roller pin.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. The phrase "at least one of A and B" should be understood to mean "only A, only B, or both A and B."

Spatially relative terms, such as "beneath," below," upper," "lower," "above", "left", "right" and the like may be used herein for ease of description to describe one element or feature's relationship to another element(s) or feature(s) as illustrated in the drawings. These spatially relative terms are intended to encompass different orientations of the device in use or operation in addition to the orientation shown in the drawings. For example, if the device in the drawings is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Although the terms "first," "second," "third" etc. may be used to describe various elements, components, regions, layers and/or sections, these elements, components, regions, layers and/or sections are not to be limited by these terms as they are used only to distinguish one element, component, region, layer or section from another element, component, region, layer or section. Thus, a first element, component, region, layer, or section could be termed a second element, component, region, layer, or section without departing from the scope and teachings of the present invention.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An apparatus comprising:

a base;

a roller pin coupled to the base;

a roller rotatably supported on the at least one roller pin;

a movable structure supported on the roller and movable over the roller relative to the base;

a finger guard comprising;

a front wall having an apex at a bottom of the finger guard and a base edge at the top of the finger guard, a side wall extending from the front wall, whereby the side wall, the front wall and the base at least partially define a cavity, and a roller pin opening extending through the front wall, the roller being at least partially disposed in the cavity with the roller pin extending through the roller pin opening, wherein a top of the roller extends above the base edge of the front wall for supporting the movable structure; and a fastener coupled to the roller pin to couple the finger guard to the base, wherein the side wall extends under a perimeter of the base to prevent access to the cavity from the bottom of the finger guard.

2. The apparatus of claim 1, wherein the sidewall extends from the perimeter of the front wall and toward the base.

3. The apparatus of claim 1, wherein the sidewall extends around a first side, a bottom, and a second side of the finger guard.

4. The apparatus of claim 3, wherein the side wall extends from the front wall by a first distance at the first side and the second side of the finger guard and extends from the front wall by a second distance greater than the first distance at the bottom of the finger guard.

5. The apparatus of claim 1, wherein the front wall includes a depression therein circumferentially disposed around the roller pin opening to define a shelf, and wherein the fastener is coupled to the roller pin and positioned against the shelf.

6. The apparatus of claim 1, wherein the front wall has a triangular shape.

7. The apparatus of claim 1, wherein a front wall of the movable structure is configured to pass in front of the front wall of the finger guard as the movable structure is moved over the roller relative to the base.

8. The apparatus of claim 1, wherein the side wall is configured to contact a user's finger to prevent pinching of the finger between the movable structure and the roller when the movable structure is moved over the roller.

9. An apparatus comprising:

a base;

a roller pin coupled to the base;

a roller rotatably supported on the at least one roller pin;

a movable structure supported on the roller and movable over the roller relative to the base;

a finger guard comprising;

a front wall having an apex at a bottom of the finger guard and a base edge at a top of the finger guard, a side wall extending from a perimeter of the front wall and toward the base, the sidewall extending around a first side, a bottom, and a second side of the finger guard, whereby the side wall, the front wall and the base at least partially define a cavity, and a roller pin opening extending through the front wall, the roller being at least partially disposed in the cavity with a top of the roller extending above the base edge of the front wall for supporting the movable structure and with the roller pin extending through the roller pin opening; and a fastener coupled to the roller pin to couple the finger guard to the base, whereby a front wall of the movable structure is positioned to pass in front of the front wall of the finger guard as the movable structure is moved over the roller relative to the base, wherein the side wall extends under a perimeter of the base to prevent access to the cavity from the bottom of the finger guard.

10. The apparatus of claim 9, wherein the side wall extends from the front wall of the finger guard by a first distance at the first side and the second side of the finger guard and extends from the front wall by a second distance greater than the first distance at the bottom of the finger guard.

11. The apparatus of claim 9, wherein the front wall of the finger guard includes a depression therein circumferentially disposed around the roller pin opening to define a shelf, and wherein the fastener is coupled to the roller pin and positioned against the shelf.

12. The apparatus of claim 9, wherein the front wall of the finger guard has a triangular.

* * * * *